United States Patent
Lin et al.

(10) Patent No.: US 12,242,007 B2
(45) Date of Patent: Mar. 4, 2025

(54) SMALL-SCALE GEOLOGICAL ANOMALOUS BODY DETECTION METHOD AND DEVICE

(71) Applicant: CHINA UNIVERSITY OF MINING & TECHNOLOGY, BEIJING, Beijing (CN)

(72) Inventors: Peng Lin, Beijing (CN); Jingtao Zhao, Beijing (CN); Suping Peng, Beijing (CN); Xiaoqin Cui, Beijing (CN)

(73) Assignee: CHINA UNIVERSITY OF MINING & TECHNOLOGY, BEIJING, Beijing (CN)

( * ) Notice: Subject to any disclaimer, the term of this patent is extended or adjusted under 35 U.S.C. 154(b) by 683 days.

(21) Appl. No.: 17/506,577

(22) Filed: Oct. 20, 2021

(65) Prior Publication Data
US 2022/0196865 A1    Jun. 23, 2022

(30) Foreign Application Priority Data
Aug. 20, 2020    (CN) .......................... 202010846124.7

(51) Int. Cl.
*G01V 1/36* (2006.01)
*G01V 1/30* (2006.01)
*G01V 1/34* (2006.01)

(52) U.S. Cl.
CPC .............. *G01V 1/362* (2013.01); *G01V 1/301* (2013.01); *G01V 1/306* (2013.01); *G01V 1/34* (2013.01)

(58) Field of Classification Search
USPC .......................................................... 702/16
See application file for complete search history.

(56) References Cited

U.S. PATENT DOCUMENTS 5,293,352 A    3/1994    Chambers
6,151,556 A    11/2000    Allen
(Continued)

FOREIGN PATENT DOCUMENTS

CN    105301649 A    2/2016
CN    107918147 A    4/2018
(Continued)

OTHER PUBLICATIONS

Liu Y et al., Prestack time migration velocity analysis and imaging of seismic diffractions, Progess in Geophysics, Dec. 2013, pp. 3023-3029, vol. 28, No. 6.
(Continued)

*Primary Examiner* — Paul D Lee
(74) *Attorney, Agent, or Firm* — IP & T GROUP LLP (57) ABSTRACT

The present disclosure provides a small-scale geological anomalous body detection method and device, and relates to the field of small-scale geological anomalous body detection. The method comprises: acquiring diffracted wave shot-gather data collected in a to-be-processed area and determining target single shot data having a distance to the center point, which is a predetermined distance; calculating a first horizontal distance between each shot point in the target single shot data and the center point and calculating a second horizontal distance between the detection point corresponding to each shot point and the center point; constructing a common-diffraction-point gather based on the first horizontal distances and the second horizontal distances; and processing the common-diffraction-point gather by using a correction algorithm of diffracted wave events to obtain a diffracted wave imaging profile.

13 Claims, 3 Drawing Sheets

(56) References Cited

U.S. PATENT DOCUMENTS

| | | | | |
|---|---|---|---|---|
| 2010/0131205 A1* | 5/2010 | Berkovitch | ............... | G01V 1/32 |
| | | | | 702/14 |
| 2014/0226437 A1 | 8/2014 | Chambers et al. | | |
| 2015/0185348 A1* | 7/2015 | Turnbull | .................. | G01V 1/36 |
| | | | | 702/14 |
| 2018/0246241 A1* | 8/2018 | Zhao | ....................... | G01V 1/307 |
| 2018/0292553 A1* | 10/2018 | Yu | ........................... | G01V 1/302 |
| 2021/0063570 A1* | 3/2021 | Liu | ........................... | G06T 5/20 |
| 2021/0181364 A1* | 6/2021 | Zhang | .................... | G01V 1/345 |
| 2021/0215842 A1* | 7/2021 | Liu | ......................... | G01V 1/345 |

FOREIGN PATENT DOCUMENTS

| | | |
|---|---|---|
| CN | 108051858 A | 5/2018 |
| CN | 110031900 A | 7/2019 |

OTHER PUBLICATIONS

First Office Action issued for priority application No. CN 202010846124.7 on Feb. 20, 2021.
First search of priority application No. CN 202010846124.7.
Supplementary search of priority document CN 202010846124.7.
Notification to Grant Patent Right for Invention of priority document CN 202010846124.7 on Mar. 26, 2021.

* cited by examiner

SMALL-SCALE GEOLOGICAL ANOMALOUS BODY DETECTION METHOD AND DEVICE

CROSS-REFERENCE TO RELATED APPLICATIONS

The present disclosure claims priority to Chinese Patent Application No. 202010846124.7, filed with the Chinese Patent Office on Aug. 20, 2020, entitled "Small-scale Geological Anomalous Body Detection Method and Device", the contents of which are incorporated herein by reference in its entirety.

TECHNICAL FIELD

The present disclosure relates to the field of high-resolution imaging of seismic exploration, in particular to a small-scale geological anomalous body detection method and device.

BACKGROUND ART

Small-scale geological anomalous bodies, such as faults, collapse columns, cracks and the like, generally have closely relationship with the distribution of mineral resources. The precise positioning of inhomogeneous and discontinuous geological anomalous body can effectively increase the success rate of exploration, reduce costs, avoid geological disasters that might happen, and avoid risks. Diffracted waves are the seismic response of small-scale geological anomalous body and contain structural information of small-scale geological anomalous body that can be used to accurately locate the inhomogeneous and discontinuous geological anomalous body and provide stronger illumination of underground space. But compared to the reflected waves, the diffracted waves are characterized by more rapid amplitude attenuation and have much weaker energy during the propagation process, and are easily masked by the reflected waves with strong energy. Therefore, it is necessary to separate the diffracted waves from the reflected waves to enhance the diffracted response, so as to perform high-precision imaging of the diffracted waves and accurately locate small-scale geological body.

In the existing methods, the diffracted wave separation is generally performed in the common-offset domain or the post-stack domain, which destroys the consistency of the wave field, and a migration algorithm is additionally required to be used to perform the diffracted wave migration process separately, and the processing flow is relatively cumbersome. This method is based on the geometrical optics characteristics of the diffracted wave propagation, and the common-diffraction-point gather data is constructed from the single shot data, which is beneficial to maintain the characteristics on consistency and integrity of the wave field, and performs the analysis on the velocity of diffracted waves by using the characteristic that the time difference of different diffracted wave shot gather at the same diffraction point is constant to, and completes the imaging process of the diffracted waves at the same time, and there is no need to perform wave field migration, and the processing flow is convenient and fast.

SUMMARY

In view of this, the purpose of the present disclosure is to provide a small-scale geological anomalous body detection method and device to improve the above technical problems.

In the first aspect, the embodiments of the present disclosure provide a small-scale geological anomalous body detection method, wherein the method comprises the following steps:

acquiring diffracted wave shot-gather data collected in a to-be-processed area and determining target single shot data in the diffracted wave shot-gather data, with the target single shot data having a distance to a position of the center point, which is a predetermined distance;

calculating a first horizontal distance between each shot point in the target single shot data and the center point, and calculating a second horizontal distance between the detection point corresponding to each shot point and the center point;

constructing a common-diffraction-point gather of the center point based on the first horizontal distances and the second horizontal distances corresponding to the center point; and processing the common-diffraction-point gather of the center point by using a correction algorithm of diffracted wave events, to obtain a diffracted wave imaging profile.

In combination with the first aspect, an embodiment of the present disclosure provides a first possible implementation of the first aspect, in which the step of processing the common-diffraction-point gather of the center point by using a correction algorithm of diffracted wave events to obtain a diffracted wave imaging profile comprises:

performing flattening correction processing on the diffracted waves in an event direction in the common-diffraction-point gather of the center point by using the correction algorithm of diffracted wave events, to obtain a flattening-corrected common-diffraction-point gather; and stacking the flattening-corrected common-diffraction-point gathers belonging to the same center point to obtain the diffracted wave imaging profile.

In combination with the first aspect, an embodiment of the present disclosure provides a second possible implementation of the first aspect, in which the number of the center points is plural, and each of the center points corresponds to one or more shot points and one or more detection points;

the step of calculating a first horizontal distance between each shot point in the target single shot data and the center point and calculating a second horizontal distance between the detection point corresponding to each shot point and the center point comprises:

calculating the first horizontal distance between each center point and each shot point in the target single shot data corresponding to the each center point; and calculating the second horizontal distance between each center point and the one or more detection points corresponding to the each center point.

In combination with the first possible implementation of the first aspect, an embodiment of the present disclosure provides a third possible implementation of the first aspect, in which the step of performing flattening correction processing on the diffracted waves in an event direction in the common-diffraction-point gather of the center point by using the correction algorithm of diffracted wave events, to obtain a flattening-corrected common-diffraction-point gather comprises:

obtaining travel time formulae of diffracted wave events with a true velocity model and a correction velocity model, and obtaining a travel time correction formula of diffracted wave events according to the travel time formulae of diffracted wave events with the true velocity model and the correction velocity model; and performing the flattening correction processing on the diffracted waves in the event direction in the common-diffraction-point gather of the center point according to the diffracted wave event travel time correction formula, to obtain the flattening-corrected common-diffraction-point gather.

In combination with the third possible embodiment of the first aspect, an embodiment of the present disclosure provides a fourth possible implementation of the first aspect, in which the step of obtaining a travel time correction formula of diffracted wave events according to the travel time formulae of diffracted wave events with the true velocity model and the correction velocity model comprises:

subtracting the travel time formula of diffracted wave events with the correction velocity model from the travel time formula of diffracted wave events with the true velocity module to obtain the travel time correction formula of diffracted wave events, wherein the travel time correction formula of diffracted wave events is expressed as:

$$t = t_0 + \frac{Sd^2 + Rd^2}{v_1^2 t_0} - \frac{Sd^2 + Rd^2}{v_0^2 t_0};$$

wherein $t_0$ indicates the vertical two-way travel time at the center point of each grid; $S_d$ indicates the first horizontal distance, and $R_d$ indicates the second horizontal distance; $V_0$ indicates the true velocity, and $V_1$ indicates the correction velocity.

In the second aspect, the embodiments of the present disclosure provide a small-scale geological anomalous body detection device, wherein the device comprises:

a data acquisition module, configured to acquire diffracted wave shot-gather data collected in a to-be-processed area and determine target single shot data in the diffracted wave shot-gather data, with the target single shot data having a distance to the position of the center point, which is a predetermined distance;

a distance calculation module, configured to calculate a first horizontal distance between each shot point in the target single shot data and the center point and calculate a second horizontal distance between the detection point corresponding to each shot point and the center point;

a gather construction module, configured to construct a common-diffraction-point gather of the center point based on the first horizontal distances and the second horizontal distances corresponding to the center point; and a gather processing module, configured to process the common-diffraction-point gather of the center point by using a correction algorithm of diffracted wave events to obtain a diffracted wave imaging profile.

In the third aspect, the embodiments of the present disclosure also provide a server, which comprises a processor and a memory, the memory storing computer executable instructions that may be executed by the processor, and the processor executes the computer executable instructions to implement the above-mentioned method.

In combination with the second aspect, an embodiment of the present disclosure provides a second possible implementation of the first aspect, in which the gather processing module is used to:

perform flattening correction processing on the diffracted waves in the event direction in the common-diffraction-point gather of the center point by using the correction algorithm of diffracted wave events, to obtain a flattening-corrected common-diffraction-point gather; and stack the flattening-corrected common-diffraction-point gathers belonging to the same center point to obtain the diffracted wave imaging profile.

In combination with the second aspect, an embodiment of the present disclosure provides a second possible implementation of the first aspect, in which the number of the center points is plural, and each of the center points corresponds to one or more shot points and one or more detection points;

the distance calculation module is used to:

calculate the first horizontal distance between each center point and each shot point in the target single shot data corresponding to the each center point; and calculate the second horizontal distance between each center point and the one or more detection points corresponding to the each center point.

In the fourth aspect, the embodiments of the present disclosure also provide a computer readable storage medium, wherein the computer readable storage medium stores computer executable instructions, and when the computer executable instructions are called and executed by the processor, the computer executable instructions cause the processor to implement the above-mentioned method.

The embodiments of the present disclosure bring about the following beneficial effects: the small-scale geological anomalous body detection method and device provided in the embodiments of the present disclosure comprises acquiring diffracted wave shot-gather data and determining target single shot data having a distance from the target single shot to the position of the center point, which is a predetermined distance; calculating a first horizontal distance between the center point and each shot point in the target single shot data, and calculating a second horizontal distance between the center point and the detection point corresponding to the each shot point; and processing the common-diffraction-point gather of the center point by using a correction algorithm of diffracted wave events to obtain a diffracted wave imaging profile. The small-scale geological anomalous body detection method and device in the embodiments of the present disclosure are based on the geometrical optical characteristics of diffracted wave propagation, construct common-diffraction-point gather data by diffracted wave shot-gather data, conduct direct velocity analysis on the diffracted waves by utilizing the sensitivity of the diffracted waves to velocity, and achieve the imaging purpose, positioning an underground space abnormal structure to reduce the accident risk.

Other features and advantages of the present disclosure will be described in the following description, and partly become obvious from the description, or understood by implementing the present disclosure. The purpose and other advantages of the present disclosure are realized and obtained in the structure specifically pointed out in the specification, claims and drawings.

In order to make the above-mentioned objects, features and advantages of the present disclosure more obvious and understandable, preferred embodiments are described in detail below in conjunction with the attached drawings.

BRIEF DESCRIPTION OF DRAWINGS

In order to more clearly illustrate the specific embodiments of the present disclosure or the technical solutions in the prior art, the drawings need to be used in the specific embodiments or the description of the prior art will be briefly introduced below, and obviously, the drawings in the following description are some embodiments of the present disclosure. For those ordinarily skilled in the art, other drawings can be also obtained in light of these drawings, without using any inventive efforts.

DETAILED DESCRIPTION OF EMBODIMENTS

In order to make the purpose, technical solutions and advantages of the embodiments of the present disclosure clearer, the technical solutions in the present disclosure will be described clearly and completely in conjunction with the accompanying drawings below. Obviously, the described embodiments are a part of the embodiments of the present disclosure, but not all of the embodiments. Based on the embodiments in the present disclosure, all other embodiments obtained by those skilled in the art without creative work shall fall within the protection scope of the present disclosure.

At present, in the process of imaging diffracted waves, for most of the existing methods, the diffracted wave separation is performed in the common-offset domain or the post-stack domain, this not only destroys the consistency of the diffracted wave field, but also requires the use of a migration algorithm to perform the diffracted wave migration process separately, which makes the imaging processing flow more cumbersome. Based on this, the embodiments of the present disclosure provide a small-scale geological anomalous body detection method and device to alleviate the above-mentioned problems.

In order to facilitate the understanding of the present embodiment, a small-scale geological anomalous body detection method disclosed in the embodiments of the present disclosure will be firstly introduced in detail.

Figure 1:
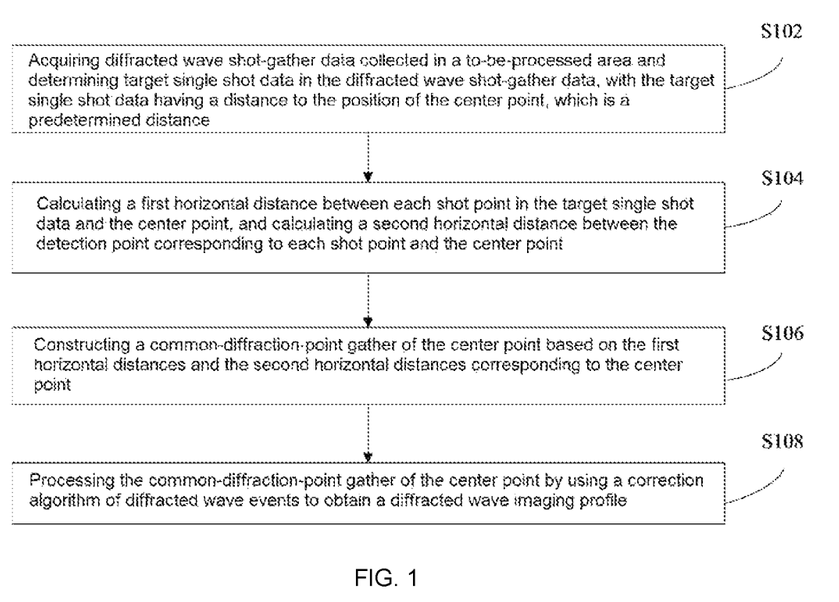
FIG. 1 is a flowchart of a small-scale geological anomalous body detection method provided by embodiments of the present disclosure.

In a possible implementation, the present disclosure provides a small-scale geological anomalous body detection method. As shown in FIG. 1 which is a flowchart of a small-scale geological anomalous body detection method provided by embodiments of the present disclosure, the method comprises the following steps:

Step S 102: acquiring diffracted wave shot-gather data collected in a to-be-processed area and determining target single shot data in the diffracted wave shot-gather data, with the target single shot data having a distance to the position of the center point, which is a predetermined distance;

Step S 104: calculating a first horizontal distance between each shot point in the target single shot data and the center point, and calculating a second horizontal distance between the detection point corresponding to each shot point and the center point;

Step S 106: constructing a common-diffraction-point gather of the center point based on the first horizontal distances and the second horizontal distances corresponding to the center point; and Step S 108: processing the common-diffraction-point gather of the center point by using a correction algorithm of diffracted wave events to obtain a diffracted wave imaging profile.

The embodiments of the present disclosure bring about the following beneficial effects: through the small-scale geological anomalous body detection method, embodiments of the present disclosure acquires diffracted wave shot-gather data and determining target single shot data having a distance to the position of the center point, which is a predetermined distance; calculates a first horizontal distance between each shot point in the target single shot data and the center point, and calculates a second horizontal distance between the detection point corresponding to each shot point and the center point; and processes the common-diffraction-point gather of the center point by using a correction algorithm of diffracted wave events to obtain a diffracted wave imaging profile. The small-scale geological anomalous body detection method and device in the embodiments of the present disclosure are based on the geometrical optical characteristics of diffracted wave propagation, construct common-diffraction-point gather data by diffracted wave shot-gather data, conduct direct velocity analysis on the diffracted waves by utilizing the sensitivity of the diffracted waves to velocity, and achieve the imaging purpose, positioning an underground space abnormal structure to reduce the accident risk.

Figure 2:
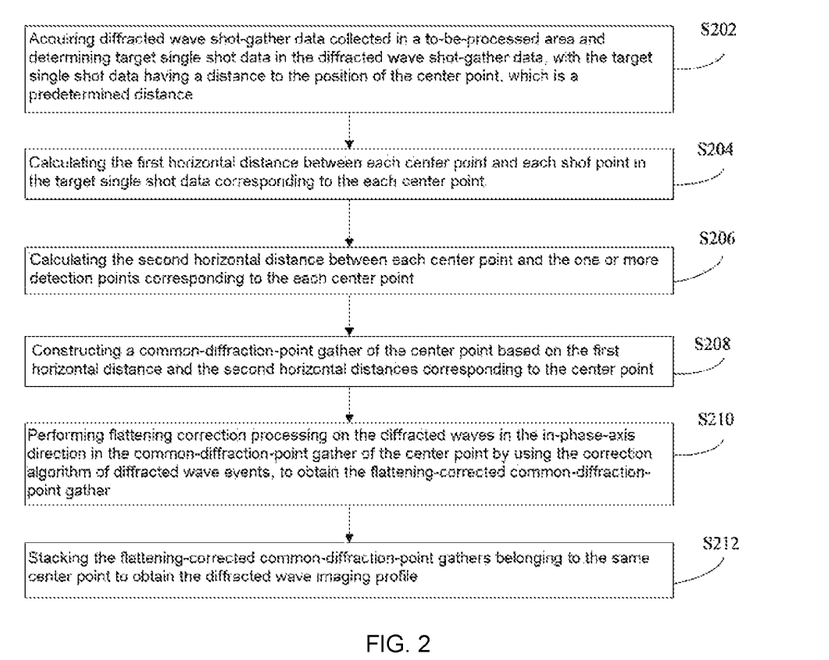
FIG. 2 is another flowchart of the small-scale geological anomalous body detection method provided by embodiments of the present disclosure.

In actual use, in order to describe the process of the method in FIG. 1 in more detail, in the embodiments of the present disclosure, FIG. 2 shows another flowchart of the small-scale geological anomalous body detection method provided by embodiments of the present disclosure, the method comprises the following steps:

Step S 202: acquiring diffracted wave shot-gather data collected in a to-be-processed area and determining target single shot data in the diffracted wave shot-gather data, with the target single shot data having a distance to the position of the center point, which is a predetermined distance.

It should be further explained that, according to the depth of the target horizon (target strata), the target shot point data, in which the shot points are away from the center point at distances which are same as the depth of the target horizon, can be maximally selected.

Step S 204: calculating the first horizontal distance between each center point and each shot point in the target single shot data corresponding to the each center point.

Step S 206: calculating the second horizontal distance between each center point and the one or more detection points corresponding to the each center point.

Figure 3:
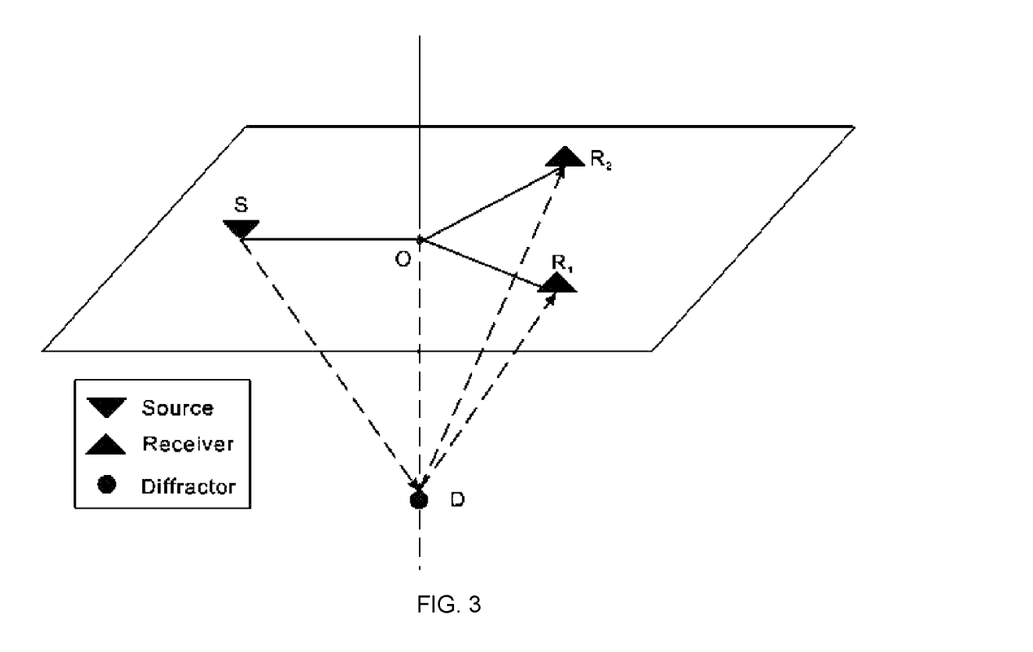
FIG. 3 is a schematic view of a first horizontal distance and a second horizontal distance provided by embodiments of the present disclosure.

In the above, in order to present the first horizontal distance and the second horizontal distance more intuitively, the embodiment of the present disclosure describes them in FIG. 3, wherein FIG. 3 is a schematic view of the first horizontal distance and a second horizontal distance provided by embodiments of the present disclosure.

In the above, point O is the center point, shot point S is the target single shot data of the center point, R1 and R2 are the detection points of the shot point, D is the underground diffraction point and its vertical projection is the point O, and the first horizontal distance $S_d$ between the shot point and the center point, and the second horizontal distances Rd between the center point and the two detection points are calculated.

Step S 208: constructing a common-diffraction-point gather of the center point based on the first horizontal distance and the second horizontal distances corresponding to the center point.

Step S 210: performing flattening correction processing on the diffracted waves in the event direction in the common-diffraction-point gather of the center point by using the correction algorithm of diffracted wave events, to obtain the flattening-corrected common-diffraction-point gather.

Specifically, the step of performing flattening correction processing on the diffracted waves in the event direction in the common-diffraction-point gather of the center point by using the correction algorithm of diffracted wave events to obtain the flattening-corrected common-diffraction-point gather comprises:

obtaining travel time formulae of diffracted wave events with the true velocity model and the correction velocity model, and obtaining a travel time correction formula of diffracted wave events according to the travel time formulae of diffracted wave events with the true velocity model and the correction velocity model; and performing the flattening correction processing on the diffracted waves in the event direction in the common-diffraction-point gather of the center point according to the travel time correction formula of diffracted wave events, to obtain the flattening-corrected common-diffraction-point gather.

Further, the step of obtaining a travel time correction formula of diffracted wave events according to the travel time formulae of diffracted wave events with the true velocity model and the correction velocity model comprises:

subtracting the travel time formula of diffracted wave events with the correction velocity model from the travel time formula of diffracted wave events with the true velocity module to obtain the travel time correction formula of diffracted wave events, wherein the travel time correction formula of diffracted wave events is expressed as:

$$t = t_0 + \frac{S_d^2 + R_d^2}{v_1^2 t_0} - \frac{S_d^2 + R_d^2}{v_0^2 t_0};$$

wherein $t_0$ indicates the vertical two-way travel time at the center point of each grid; $S_d$ indicates the first horizontal distance, and $R_d$ indicates the second horizontal distance; $V_0$ indicates the true velocity, and $V_1$ indicates the correction velocity.

Step S 212: stacking the flattening-corrected common-diffraction-point gathers belonging to the same center point to obtain the diffracted wave imaging profile.

In summary, the small-scale geological anomalous body detection method and device of the present disclosure can acquire diffracted wave shot-gather data and determine target single shot data having a distance to the position of the center point, which is a predetermined distance; calculate a first horizontal distance between each shot point in the target single shot data and the center point, and calculate a second horizontal distance between the detection point corresponding to each shot point and the center point; and process the common-diffraction-point gather of the center point by using a correction algorithm of diffracted wave events to obtain a diffracted wave imaging profile. The small-scale geological anomalous body detection method and device in the embodiments of the present disclosure are based on the geometrical optical characteristics of diffracted wave propagation, construct common-diffraction-point gather data by diffracted wave shot-gather data, conduct direct velocity analysis on the diffracted waves by utilizing the sensitivity of the diffracted waves to velocity, and achieve the imaging purpose, positioning an underground space abnormal structure to reduce the accident risk.

Figure 4:
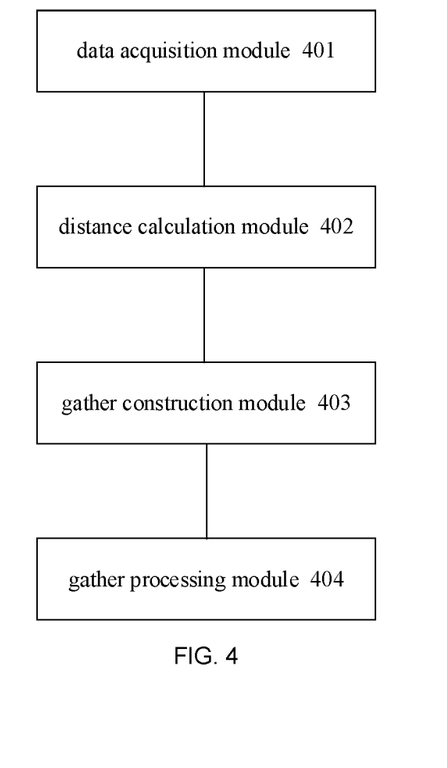
FIG. 4 is a structural block view of a small-scale geological anomalous body detection device provided by embodiments of the present disclosure.

In another possible implementation, corresponding to the small-scale geological anomalous body detection method provided by the above-mentioned embodiment, the embodiment of the present disclosure further provides a small-scale geological anomalous body detection device. FIG. 4 is a structural block view of a small-scale geological anomalous body detection device provided by embodiments of the present disclosure. As shown in FIG. 4, the device comprises:

a data acquisition module 401, used to acquire diffracted wave shot-gather data collected in a to-be-processed area and determine target single shot data in the diffracted wave shot-gather data, with the target single shot data having a distance to the position of the center point, which is a predetermined distance;

a distance calculation module 402, used to calculate a first horizontal distance between each shot point in the target single shot data and the center point and calculate a second horizontal distance between the detection point corresponding to each shot point and the center point;

a gather construction module 403, used to construct a common-diffraction-point gather of the center point based on the first horizontal distances and the second horizontal distances corresponding to the center point; and a gather processing module 404, used to process the common-diffraction-point gather of the center point by using a correction algorithm of diffracted wave events to obtain a diffracted wave imaging profile.

In actual use, the gather processing module 404 is used to:
perform the flattening correction processing on the diffracted waves in the event direction in the common-diffraction-point gather of the center point by utilizing the correction algorithm of diffracted wave events, to obtain the flattening-corrected common-diffraction-point gather;

stack the flattening-corrected common-diffraction-point gathers belonging to the same center point to obtain the diffracted wave imaging profile.

In actual use, the number of the center points is plural, and each of the center points corresponds to one or more shot points and one or more detection points;

the distance calculation module 402 is used to:
calculate the first horizontal distance between each center point and each shot point in the target single shot data corresponding to the each center point; and
calculate the second horizontal distance between each center point and the one or more detection points corresponding to the each center point.

Figure 5:
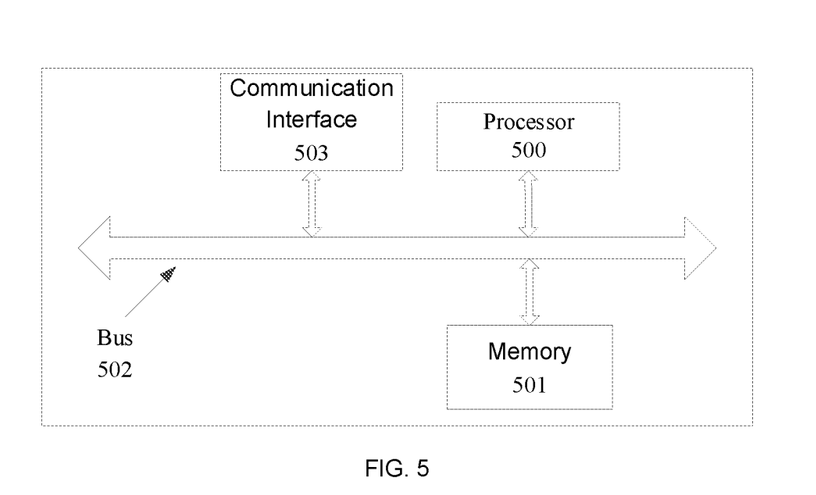
FIG. 5 is a structural schematic view of a server provided by embodiments of the present disclosure.

In another possible implementation, an embodiment of the present disclosure also provides a server. FIG. 5 shows a structural schematic view of a server provided by embodiments of the present disclosure. Referring to FIG. 5, the server comprises: a processor 500, a memory 501, a bus 502, and a communication interface 503, wherein the processor 500, the memory 501, and the communication interface 503 are connected via the bus 502; and the processor 500 is used to execute executable modules, such as computer programs, stored in the memory 501.

In the above, the memory 501 stores computer executable instructions that may be executed by the processor 500, and the processor 500 executes the computer executable instructions to implement the above-mentioned method.

Further, the memory 501 may comprise a high-speed random access memory (RAM), or may also comprise a non-volatile memory, for example, at least one disk memory. The communication between the network element of the system and at least one other network element is realized through at least one communication interface 503 (which may be wired or wireless), and the Internet, wide area network, local network, metropolitan area network or the like may be used.

The bus 502 may be an ISA bus, a PCI bus, an EISA bus, or the like. The bus can be divided into address bus, data bus, control bus and the like. For ease of presentation, only one bidirectional arrow is used for indication in FIG. 4, but it does not mean that there is only one bus or one type of bus.

In the above, the memory 501 is used to store program(s), and the processor 500 executes the program(s) after receiving the program execution instruction. The small-scale geological anomalous body detection method disclosed in any foregoing implementation of the embodiments of the present disclosure may be applied to the processor 500, or implemented by the processor 500.

In addition, the processor 500 may be an integrated circuit chip with signal processing capabilities. In the implementation process, the steps of the foregoing method can be completed by integrated logic circuits of hardware or instructions in the form of software in the processor 500. The above-mentioned processor 500 may be a general-purpose processor, including a Central Processing Unit (CPU for short), a Network Processor (NP for short) and the like; it may also be a Digital Signal Processor (DSP for short), Application Specific Integrated Circuit (ASIC for short), Field-Programmable Gate Array (FPGA for short) or other programmable logic devices, discrete gates or transistor logic devices, discrete hardware components. The methods, steps, and logical block diagrams disclosed in the embodiments of the present disclosure can be implemented or executed. The general-purpose processor may be a microprocessor or the processor may also be any conventional processor or the like. The steps of the method disclosed in the embodiments of the present disclosure may be directly embodied as being executed and completed by a hardware decoding processor, or executed and completed by a combination of hardware and software modules in the decoding processor. The software module can be located in random access memory, flash memory, read-only memory, programmable read-only memory, or electrically erasable programmable memory, register and other mature storage mediums in the field. The storage medium is located in the memory 501, and the processor 500 reads the information in the memory 501, and completes the steps of the above-mentioned method in combination with its hardware.

In still another possible implementation, an embodiment of the present disclosure also provides a computer readable storage medium, the computer readable storage medium stores computer executable instructions, and when the computer executable instructions are called and executed by the processor, the computer executable instructions cause the processor to implement the above-mentioned method.

The small-scale geological anomalous body detection device provided by the embodiment of the present disclosure has the same technical features as the small-scale geological anomalous body detection method provided by the above-mentioned embodiments, so it can also solve the same technical problems and achieve the same technical effects.

The computer program product of the small-scale geological anomalous body detection method and device provided by the embodiments of the present disclosure comprises a computer readable storage medium storing program codes, and the instructions included in the program codes can be used to execute the methods described in the previous method embodiments, and for specific implementation, please refer to the method embodiments, which will not be repeated here.

Those skilled in the art can clearly understand that, for the convenience and simplicity of description, the specific working process of the device described above can refer to the corresponding process in the foregoing method embodiments, which will not be repeated here.

In addition, in the description of the embodiments of the present disclosure, unless otherwise definitely specified and limited, the terms "mount", "link", and "connect" should be understood in a broad sense, for example, they can be fixed connection, detachable connection, or integrated connection; they can be mechanical connection or electrical connection; they can be directly connection or indirectly connection by intermediate medium, and they can be the internal communication between two components. For those skilled in the art, the specific meaning of the above-mentioned terms in the present disclosure can be understood in specific situations.

If the function is implemented in the form of a software functional unit and sold or used as an independent product, it can be stored in a computer readable storage medium. Based on this understanding, the technical solution of the present disclosure essentially or the part that contributes to the existing technology or the part of the technical solution can be embodied in the form of a software product, and the computer software product is stored in a storage medium, and includes a number of instructions to enable a computer device (which may be a personal computer, a server, or a network device or the like) to execute all or part of the steps of the methods described in the various embodiments of the present disclosure. The aforementioned storage medium comprises: U disk, mobile hard disk, read-only memory (ROM), random access memory (RAM), magnetic disk or optical disk and other mediums that can store program codes.

In the description of the present disclosure, it should be noted that the orientation or positional relationship indicated by the terms such as "center", "upper", "lower", "left", "right", "vertical", "horizontal", "inner", "outer" are based on the orientation or positional relationship as shown in the accompanying drawings, merely for facilitating the description of the present disclosure and simplifying the description, rather than indicating or implying that related devices or elements have to be in the specific orientation, or configured or operated in a specific orientation, therefore, they should not be understood as limitations on the present disclosure. Besides, terms "first", "second" and "third" are merely for describing the purpose, but should not be understood as indicating or implying importance in relativity.

Finally, it should be noted that: the above embodiments are only specific embodiments of the present disclosure and used to illustrate the technical solution of the present disclosure, not to limit it, and the protection scope of the present disclosure is not limited thereto. Although the present disclosure has been described in detail with reference to the above-mentioned embodiments, those skilled in the art should understand that: any skilled person familiar with the technical filed, within the technical scope disclosed in the present disclosure, can still modify the technical solution recorded in the above-mentioned embodiments or easily conceive changes, or equivalently replace some of the technical features; and these modifications, changes or substitutions do not make the essence of the corresponding technical solutions out of the spirit and scope of the technical solutions of the embodiments of the present disclosure, which should all be covered within the protection scope of the present disclosure. Therefore, the protection scope of the present disclosure should be subject to the protection scope of the claims.

What is claimed is:

1. A small-scale geological anomalous body detection method, comprising following steps of:
    acquiring, by one or more processors, diffracted wave shot-gather data collected in a to-be-processed area, and determining target single shot data in the diffracted wave shot-gather data, with the target single shot data having a distance to a position of at least one center point which is a predetermined distance;
    calculating a first horizontal distance between the at least one center point and each shot point in the target single shot data and calculating a second horizontal distance between the at least one center point and a detection point corresponding to each shot point;
    constructing a common-diffraction-point gather of the at least one center point based on the first horizontal distances and the second horizontal distances corresponding to the at least one center point; and
    processing the common-diffraction-point gather of the at least one center point by using a correction algorithm of diffracted wave events to obtain a diffracted wave imaging profile;
    and positioning an underground space abnormal structure by using the diffracted wave imaging profile.

2. The method according to claim 1, wherein the step of processing the common-diffraction-point gather of the at least one center point by using a correction algorithm of diffracted wave events to obtain a diffracted wave imaging profile comprises steps of:
    performing flattening correction processing on the diffracted waves in an event direction in the common-diffraction-point gather of the at least one center point by using the correction algorithm of diffracted wave events, to obtain a flattening-corrected common-diffraction-point gather; and
    stacking the flattening-corrected common-diffraction-point gathers belonging to a same center point to obtain the diffracted wave imaging profile.

3. The method according to claim 2, wherein the step of performing flattening correction processing on the diffracted waves in an event direction in the common-diffraction-point gather of the at least one center point by using the correction algorithm of diffracted wave events, to obtain a flattening-corrected common-diffraction-point gather comprises steps of:
    obtaining travel time formulae of diffracted wave events with a true velocity model and a correction velocity model, and obtaining a travel time correction formula of diffracted wave events according to the travel time formulae of diffracted wave events with the true velocity model and the correction velocity model; and
    performing the flattening correction processing on the diffracted waves in the event direction in the common-diffraction-point gather of the at least one center point according to the travel time correction formula of diffracted wave events, to obtain the flattening-corrected common-diffraction-point gather.

4. The method according to claim 3, wherein the step of obtaining a travel time correction formula of diffracted wave events according to the travel time formulae of diffracted wave events with the true velocity model and the correction velocity model comprises:
    subtracting the travel time formula of diffracted wave events with the correction velocity model from the travel time formula of diffracted wave events with the true velocity module to obtain the travel time correction formula of diffracted wave events,
    wherein the travel time correction formula of diffracted wave events is expressed as:

$$t = t_0 + \frac{S_d^2 + R_d^2}{v_1^2 t_0} - \frac{S_d^2 + R_d^2}{v_0^2 t_0};$$

wherein $t_0$ indicates vertical two-way travel time at the center point of each grid; $S_d$ indicates the first horizontal distance, and $R_d$ indicates the second horizontal distance; $V_0$ indicates the true velocity, and $V_1$ indicates the correction velocity.

5. The method according to claim 1, wherein a number of the at least one center point is plural, and each center point corresponds to one or more shot points and one or more detection points;
    the step of calculating a first horizontal distance between the at least one center point and each shot point in the target single shot data and calculating a second horizontal distance between the at least one center point and a detection point corresponding to each shot point comprises steps of:
        calculating the first horizontal distance between the each center point and the each shot point in the target single shot data corresponding to the each center point; and
        calculating the second horizontal distance between the each center point and the one or more detection points corresponding to the each center point.

6. A small-scale geological anomalous body detection device, comprising:
    one or more processors, a memory, a bus and a communication interface, wherein the one or more processors, when running, implements the method according to claim 1.

7. The device according to claim 6, wherein the step of processing the common-diffraction-point gather of the at least one center point comprises steps of:
    performing flattening correction processing on the diffracted waves in an event direction in the common-diffraction-point gather of the at least one center point by using the correction algorithm of diffracted wave events, to obtain a flattening-corrected common-diffraction-point gather; and
    stacking the flattening-corrected common-diffraction-point gathers belonging to a same center point to obtain the diffracted wave imaging profile.

8. The device according to claim 6, wherein a number of the at least one center points is plural, and each center point corresponds to one or more shot points and one or more detection points; and
    the step of calculating a first horizontal distance between the at least one center point and each shot point in the target single shot data and calculating a second horizontal distance between the at least one center point and a detection point corresponding to each shot point comprises steps of:
  calculating the first horizontal distance between the each center point and the each shot point in the target single shot data corresponding to the each center point; and
  calculating the second horizontal distance between the each center point and the one or more detection points corresponding to the each center point.

9. A server, comprising a processor and a memory, wherein the memory is configured for storing computer executable instructions executable by the processor, and the processor is configured for executing the computer executable instructions to implement the method of claim 1.

10. The server according to claim 9, wherein the step of processing the common-diffraction-point gather of the at least one center point by using a correction algorithm of diffracted wave events to obtain a diffracted wave imaging profile comprises steps of:
  performing flattening correction processing on the diffracted waves in an event direction in the common-diffraction-point gather of the at least one center point by using the correction algorithm of diffracted wave events, to obtain a flattening-corrected common-diffraction-point gather; and
  stacking the flattening-corrected common-diffraction-point gathers belonging to a same center point to obtain the diffracted wave imaging profile.

11. The server according to claim 10, wherein the step of performing flattening correction processing on the diffracted waves in an event direction in the common-diffraction-point gather of the at least one center point by using the correction algorithm of diffracted wave events, to obtain a flattening-corrected common-diffraction-point gather comprises steps of:
  obtaining travel time formulae of diffracted wave events with a true velocity model and a correction velocity model, and obtaining a travel time correction formula of diffracted wave events according to the travel time formulae of diffracted wave events with the true velocity model and the correction velocity model; and
  performing the flattening correction processing on the diffracted waves in the event direction in the common-diffraction-point gather of the at least one center point according to the travel time correction formula of diffracted wave events, to obtain the flattening-corrected common-diffraction-point gather.

12. The server according to claim 11, wherein the step of obtaining a travel time correction formula of diffracted wave events according to the travel time formulae of diffracted wave events with the true velocity model and the correction velocity model comprises:
  subtracting the travel time formula of diffracted wave events with the correction velocity model from the travel time formula of diffracted wave events with the true velocity module to obtain the travel time correction formula of diffracted wave events,
  wherein the travel time correction formula of diffracted wave events is expressed as:

$$t = t_0 + \frac{Sd^2 + Rd^2}{v_1^2 t_0} - \frac{Sd^2 + Rd^2}{v_0^2 t_0};$$

wherein $t_0$ indicates vertical two-way travel time at the center point of each grid; $S_d$ indicates the first horizontal distance, and $R_d$ indicates the second horizontal distance; $V_0$ indicates the true velocity, and $V_1$ indicates the correction velocity.

13. The server according to claim 9, wherein a number of the at least one center point is plural, and each center point corresponds to one or more shot points and one or more detection points; and
  the step of calculating a first horizontal distance between the at least one center point and each shot point in the target single shot data and calculating a second horizontal distance between the at least one center point and a detection point corresponding to each shot point comprises steps of:
    calculating the first horizontal distance between the each center point and the each shot point in the target single shot data corresponding to the each center point; and
    calculating the second horizontal distance between the each center point and the one or more detection points corresponding to the each center point.

* * * * *